Patented Mar. 5, 1935

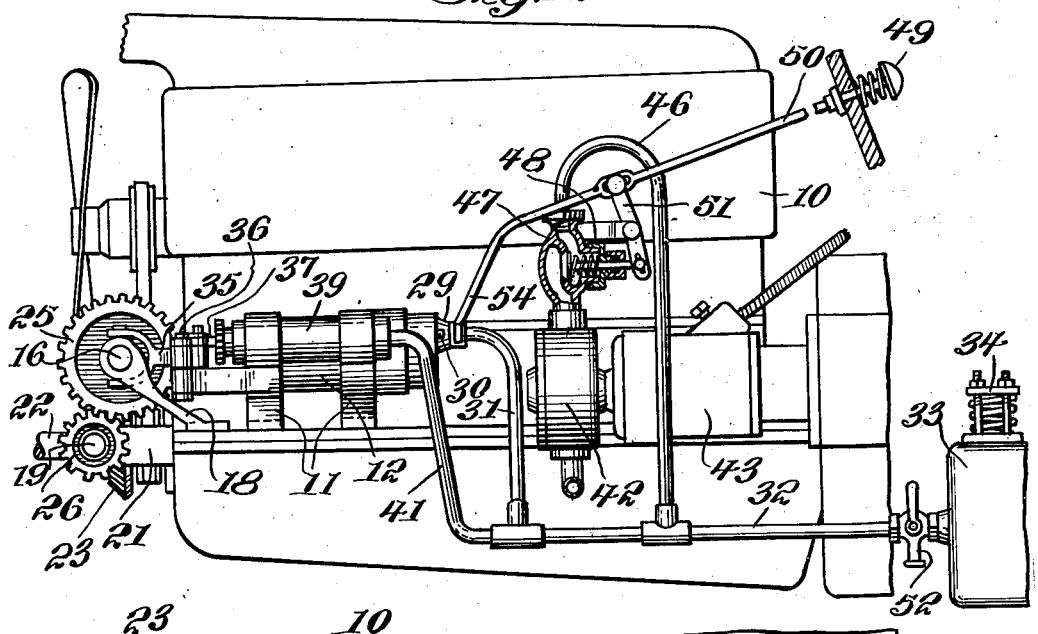

1,993,583

UNITED STATES PATENT OFFICE 1,993,583

PNEUMATIC EQUIPMENT FOR VEHICLE MOTORS

Frank Arena, Elba, N. Y.

Application April 17, 1933, Serial No. 666,620

1 Claim. (Cl. 230—15)

The object of the invention is to provide equipment for application to the conventional auto vehicle power equipment to serve as an auxiliary therefor in conjunction with the conventional starting motor, to be resorted to in the event of failure of the usual starting motor, as in cases where additional starting torque is required, as in cold weather; to provide equipment for application to motor vehicles that may automatically function as an air supply and may be employed for various uses around the vehicle, as the inflation of tires in cases of necessity; and generally to provide equipment of the kind indicated which is of simple form and susceptible of cheap manufacture and easy installation in vehicles without any modification, or at least any material modification thereof.

With this object in view, the invention consists, in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claim.

In the drawing:

Figure 1 is a side elevational view of an auto vehicle motor showing the invention applied in operative position thereon.

Figure 2 is a top plan view of a portion of a vehicle motor with the attendant equipment comprising the invention, parts of the latter being shown in section.

Figure 3 is a detail vertical sectional view taken substantially in the axis of the piston of the air pump.

The invention comprises an air pump, an air motor and an air storage tank, as shown, the storage tank being preferably positioned behind the vehicle motor 10, while the air pump is positioned at the forward end of the motor and appropriately supported on the latter, as by brackets 11.

The air pump comprises a cylinder 12 in which is positioned a piston 14, the piston being open-ended and the connecting rod 15 extending through the open end to connect with the crank shaft 16 journalled in brackets 17 and 18 mounted on the frame of the motor 10. The crank shaft 16 is operatively connected with a countershaft 19, the latter being journalled in bearing brackets 20 and 21 and being driven from the main shaft 22 of the motor or engine 10 by a bevel gear couple of which the driver 23 is mounted on the shaft 22 and the driven gear 24 mounted on the countershaft 19. A gear and pinion connection effects the drive between the countershaft and the crank shaft and consists of a gear 25 mounted on the former and a pinion 26 mounted on the latter. The driving connection between the countershaft and the crank shaft is, however, clutch controlled, the gear 25 normally floating on the crank shaft and being provided with a clutch element 27 for engagement with a clutch element 28 axially movable upon but keyed to the crank shaft. When the clutch elements 27 and 28 are engaged, a positive drive is effected between the countershaft and crank shaft; when disengaged, the crank shaft remains at rest, even though the countershaft be driven by the motor.

In the head of the cylinder 12 there are mounted the discharge valve 29 and the intake valve 30, both these valves being normally closed by spring action. The valve 30 opens to the atmosphere on the suction stroke of the piston, while the valve 29 opens to a conductor 31 on the pressure stroke, the conductor 31 being connected in on a conductor 32 which communicates with the air storage tank which consists of a conventional form of tank 33 provided with a safety valve 34.

The clutch element 28 is controlled by a bell crank rocker 35, pivotally mounted as at 36, with the resistance arm connected with the clutch element and the force arm operatively connected with the piston stem 37 of a piston 38, the latter being slidably mounted in a supplemental cylinder 39 and spring pressed, as indicated at 40, for movement in one direction, which is a direction to effect movement of the rocker to secure clutch engaging position. The piston is moved in the opposite direction by reason of air under pressure admitted through the end of the cylinder which is in communication with the tank 33 as well as with the pump because of the tubular conductor 41.

If the air pressure in the tank is low, the spring 40 will function to shift the piston 38 and effect engagement of the clutch elements 28 and 27. If the motor 10 is rotating, the countershaft will then drive the crank shaft and the pump piston 14 will be reciprocated with the result that air will be taken into the cylinder 12 through the valve 30 and ejected through the valve 29 into the conductor 30 and thence into the tank 33. On the attainment of a predetermined pressure in the tank, such pressure will be reflected in the cylinder 39 on the piston 38 in opposition to the spring 40 with the result that the piston will be moved in the opposite direction to the movement imparted by the spring and the clutch element 28 will be disengaged from the clutch element 27, so that the air pump will remain inactive, until the air pressure in the system falls to a point where the spring 40 may function to re-engage the clutch elements.

A part of the equipment comprising the invention consists of a pneumatic motor 42 which is preferably mounted with its axis of rotation coincident with the axis of rotation of the armature of the conventional electric starting motor 43, the rotor of the pneumatic motor and the armature of the electric motor being interconnected. The starting motor 43 may be actuated singly to engage the pinion 44 with the flywheel gear 45, or it may be actuated in conjunction with the pneumatic motor which derives its supply from the air storage tank 33 through a conductor 46 which is tapped in on the conductor 32 and feeds the pneumatic motor through a valve 47, the disk of the latter being normally seated by a spring 48. The valve is opened by unseating the disk by the application of pressure to a spring raised push button 49 connected with a push rod 50, the latter being connected with the force arm of a lever 51, whose resistance arm is connected to the stem of the disk of the valve. The push button 49 is preferably seated in the toeboard of the vehicle, so that pressure may be readily applied with the foot and valve opening movement accomplished thereby when, of course, air under pressure will flow through the conductor 46 and through the valve 47 to the air motor, thus setting it in operation.

A valve 52 is disposed in the conductor 32 adjacent the storage tank 33 to function as an air take-off valve by means of which the stored air may be used for auxiliary purposes, as through an air hose for the inflation of tires, or as a blower, or for equivalent purposes.

The invention having been described, what is claimed as new and useful is:

Pneumatic equipment for auto vehicle motors comprising in combination with such motor, an air pump mounted at the side of the same with the axis of the cylinder parallel with the axis of the motor crank shaft, the air pump comprising an open-ended cylinder with the open end directed forwardly, a transverse crank shaft operatively connected with the air pump cylinder, a countershaft paralleling the crank shaft and having a bevel gear connection with the vehicle motor, a clutch element slidably mounted on the crank shaft and having a gear connection with the countershaft, a clutch member keyed to the crank shaft and engageable with and disengageable from the clutch element, an air cylinder disposed parallel to the pump cylinder and provided with a spring-pressed piston operatively connected with the clutch member to engage the latter with the clutch element, and a tubular connection between the pump cylinder and the air cylinder to effect operation of the piston of the latter by air pressure to disengage the clutch member from the clutch element.

FRANK ARENA.